United States Patent [19]
Katsuda et al.

[11] Patent Number: 6,106,009
[45] Date of Patent: Aug. 22, 2000

[54] GAS GENERATOR FOR AIRBAG AND AIR BAG SYSTEM

[75] Inventors: Nobuyuki Katsuda; Yoshihiro Nakashima, both of Himeji, Japan

[73] Assignee: Daicel Chemical Industries, Ltd., Osaka, Japan

[21] Appl. No.: 08/862,424

[22] Filed: May 23, 1997

[30] Foreign Application Priority Data

May 15, 1997 [JP] Japan ................................. 9-125140

[51] Int. Cl.$^7$ ................................................. B60R 21/26
[52] U.S. Cl. ................................................ 280/741; 280/742
[58] Field of Search ................................. 280/736, 741, 280/742; 102/530, 531

[56] References Cited

U.S. PATENT DOCUMENTS

| | | | |
|---|---|---|---|
| 3,891,233 | 6/1975 | Damon | 280/741 |
| 4,012,211 | 3/1977 | Goetz | 280/741 |
| 4,249,673 | 2/1981 | Katoh et al. | 280/741 |
| 4,316,874 | 2/1982 | Kasama et al. | 280/741 |
| 5,005,486 | 4/1991 | Lenzen | 102/531 |
| 5,556,131 | 9/1996 | Bender et al. | 280/741 |
| 5,620,205 | 4/1997 | Lauritzen et al. | 280/741 |
| 5,645,298 | 7/1997 | Stevens et al. | 280/741 |
| 5,806,888 | 9/1998 | Adamini | 280/741 |

*Primary Examiner*—Paul N. Dickson

[57] ABSTRACT

A gas generator for air bag, which can be formed into a configuration that is longer in the axial direction, is advantageous not only from the viewpoint of manufacture but also from the viewpoint of the operational performance, and can be disposed suitably on a passenger's seat side. The gas generator for air bag includes a housing having a plurality of gas discharge ports and includes, within the housing, an igniter to be operated by an impact sensor upon sensing an impact, a gas generator to be ignited by the ignitor and burned to generate a combustion gas, and a filter for performing cooling of the combustion gas and/or catching of the combustion residues. The housing is substantially shaped like a cylinder which is longer in the axial direction and provided, in a circumferential wall thereof, with a plurality of gas discharge ports disposed in at least the axial direction. The filter is accommodated within the housing in such a way that an outer periphery thereof opposes an inner surface of the circumferential wall of the housing and forms a gap between the filter and the inner surface of the housing.

20 Claims, 2 Drawing Sheets

GAS GENERATOR FOR AIRBAG AND AIR BAG SYSTEM

FIELD OF THE INVENTION

The present invention relates to a gas generator for air bag that protects a passenger from an impact, and an air bag system.

DESCRIPTION OF THE RELATED ART

In order to protect a passenger from an impact that occurs at a time of collision, an air bag system is mounted on a vehicle, for example, an automobile. When a sensor senses an impact, this air bag system operates a gas generator to thereby form a cushion (air bag) between the passenger and the vehicle. The gas generator is operated by igniting means, which is ignited due to the impact detected by the impact sensor and burning gas generating means to generate a combustion gas. Conventionally, this gas generator includes a mechanical ignition type gas generator using a mechanical sensor that senses an impact solely by the use of a mechanical constitution, and an electrical ignition type gas generator which is operated by an electric signal sent from an electrical sensor, such as a semiconductor type acceleration sensor, that senses an impact.

Since the above-mentioned gas generator is incorporated into an optimum position of the vehicle body such as a steering wheel and the interior of a dash board with a passenger's safety taken into consideration, it is required that the gas generator be optimum to each incorporation position in terms of the amount of gas generated, entire volume, configuration or operational characteristic.

Especially, in the case of the air bag system for use in a passenger's seat, a larger amount of gas is required than in the case of the air bag system for use in a driver's seat. Further, the entire configuration of the air bag system receives a limitation according to the space of a position where the air bag system is accommodated. Accordingly, in the gas generator used in the air bag system for a passenger's seat, a gas generator for air bag having a configuration and characteristic that are different from those of the gas generator used in the air bag system for the driver's seat is required.

However, the gas generator for air bag as disclosed conventionally is a gas generator having a configuration that is suitable for the air bag system disposed mainly on a driver's seat side. A housing of such gas generator is generally formed by welding the respective end portions of a diffuser shell having gas discharge ports and a closure shell having an igniter accommodation opening by one of various welding processes such as plasma welding, friction welding, projection welding, electron beam welding, laser welding or TIG welding. The entire configuration thereof is shaped like a cylinder that is shorter in the axial direction. Such a configuration is not suitable for the air bag system disposed in the passenger's seat side. That is, in a case where the air bag system is disposed on the passenger's seat side, since in almost all cases the air bag system is accommodated inside a dash board, it is preferable that the housing of the gas generator be relatively long in the axial direction and that the circumferential wall thereof be formed with gas discharge ports in the axial and circumferential directions. Therefore, conventionally, especially in a case where the air bag system is disposed in the passenger's seat side, the gas generator for air bag uses the housing formed with gas discharge ports in the axial and circumferential directions, and the gas generator that is longer in the axial direction and is substantially shaped like a cylinder is used.

However, despite the gas generator for air bag as conventionally provided and disposed in the passenger's seat side being required to have a configuration and operational performance different from those of the gas generator for air bag for the driver's seat side, the gas generator for the passenger's seat is only diverted to the one for use on the passenger's seat by merely modifying the gas generator for driver's seat side in terms of the configuration, whereupon the gas generator for use on the passenger's seat is not arranged to have a structure optimum in terms of the configuration suitable for disposing in the passenger's seat side.

SUMMARY OF THE INVENTION

In view of the above, an object of the present invention is to provide a gas generator for air bag which solves the problems inherent to the abovementioned conventional gas generator for air bag, and can be disposed also on the passenger's seat side, i.e., can be formed into a configuration that is longer in the axial direction and therefore is advantageous from the viewpoint of manufacture and operational performance.

The gas generator for air bag according to the present invention has a feature in terms of the configuration of the housing in particular.

That is, the gas generator for air bag of the present invention includes a housing having a plurality of gas discharge ports and includes, within the housing igniting means to be operated by an impact sensor sensing an impact, gas generating means to be ignited by the igniting means and burned to generate a combustion gas, and filter means for performing cooling of the combustion gas and/or catching of the combustion residues, whereby the housing is substantially shaped like a cylinder that is longer in the axial direction and formed, in a circumferential wall thereof, with a plurality of gas discharge ports disposed in at least the axial direction; and the filter means is accommodated within the housing in such a way that an outer periphery thereof opposes an inner surface of the circumferential wall of the housing and a gap being formed between the filter means and this inner surface.

The gap between the inner surface of the circumferential wall of the housing and the outer periphery of the filter means is ensured not only by the cylindrical member and the cup-shaped portion in combination with each other to thereby form the housing as described later but also by the filter means fixed directly to the housing interior by welding or adhesion so as to ensure the gap or by the filter means fixed using a separate member for fixing the filter means so as to ensure the gap.

Also, according to another aspect of the present invention, a gas generator suitably accommodating necessary members for the gas generator for air bag such as the igniter, gas generating agent, etc. inside the housing of the gas generator formed substantially into a cylindrical configuration by combining the cylindrical member and the cup-shaped member, is also provided.

That is, the gas generator for air bag according to this another aspect of the present invention includes, within a housing igniting means to be operated by an impact sensor sensing an impact, gas generating means to be ignited by the igniting means and burned to generate a combustion gas and filter means for performing cooling of the combustion gas and/or catching of the combustion residues, whereby the housing is composed of a cylindrical member substantially shaped like a cylinder including a circumferential wall having a plurality of gas discharge ports and one end side wall having a central opening, and a cup-shaped member which is substantially shaped like a cup and which is integrally formed, at a circumferential edge of the other end flat surface portion thereof, with a forward end annulus portion mounted on the other end opening of the cylindrical member.

The cylindrical member is substantially shaped like a cylinder and has a plurality of gas discharge ports formed in the circumferential wall, and has at one end side surface thereof a central opening for accommodating the igniting means. The other end side surface of the cylindrical member is open and this opening is closed by the cup-shaped member as later described. The gas discharge ports formed in the circumferential wall of the cylindrical member are not only formed circumferentially in one row but also formed circumferentially in two or more rows to provide the circumferential wall wherein the gas discharge ports are arranged circumferentially and axially. The central opening formed in the one end side surface is intended to permit the insertion of the igniting means thereinto. Besides simply boring this central opening in the flat configuration of the igniting means, an igniting means retention portion can be formed by bending the edge portion of the opening in the axial direction of the cylindrical member. In this case, the igniting means can be prevented from moving in the axial direction of the cylindrical member by supporting or retaining the igniting means by a forward end of the igniting means retention portion bent in the axial direction. Also, the cylindrical member can be formed, on a circumferential surface thereof, with a crank-shaped portion for the formation of a swollen circumferential wall portion prepared by the circumferential wall surface slightly swollen radially outwardly. By forming the crank-shaped portion on the circumferential surface of the cylindrical member, the circumferential wall surface of the cylindrical member is slightly swollen in the radial direction thereof.

The other end opening of the cylindrical member, whose circumferential wall surface is slightly swollen in the radial direction, is closed by the cup-shaped member. This cup-shaped member is composed an end flat surface portion opposing the one end side surface of the cylindrical member, and the forward end annulus portion integrally formed at the circumferential edge of the end flat surface portion and inserted into the other end opening of the cylindrical member. In order to mount the gas generator of the present invention into the module casing, the gas generator attaching member extending in the axial direction of the cup-shaped member can be formed substantially at the center of the other end flat surface portion of the cup-shaped member. In the present invention, since the cylindrical member and the cup-shaped member can be formed separately from each other, it is possible to easily form the attaching member on the cup-shaped member. Accordingly, the gas generator of the present invention can be easily manufactured by integrating the cup-shaped member provided beforehand with the attaching member after incorporating the members necessary in terms of the structure of the gas generator such as the igniting means, gas generating means and filter into the cylindrical member.

In the present invention, since the housing is formed by combining the cylindrical member and the cup-shaped member having the forward end annulus portion, in a case where on the circumferential wall surface of the cylindrical member, the crank-shaped portion bent in such a way as to protrude radially and outwardly in the shape of a crank is formed to form the swollen circumferential wall portion prepared by a part of the circumferential wall surface swollen by the crank-shaped portion and the forward end annulus portion of the cup-shaped portion is inserted or fitted into the inside of the other end opening, the forward end annulus portion can function as a spacer for providing the gap between the filter means accommodated within the housing and the circumferential wall of the cylindrical member. In this case, it is preferable that by, for example, the circumferential wall of the cylindrical member swollen by the extent corresponding to the thickness of the forward end annulus portion of the cup-shaped member, the inner surface of the circumferential wall surface not swollen of the cylindrical member be flush with the inner surface of the forward end annulus portion of the cup-shaped member. Also, it is preferable that the size of the one end side surface of the cylindrical member and the size of the other end flat surface portion of the cup-shaped member is regulated such that the swollen circumferential wall surface becomes parallel with the axis of the cylindrical member. As a result, the gap between the filter means and the circumferential wall of the cylindrical member can be constant.

It is to be noted that in a case where the swollen circumferential wall portion of the cylindrical member is inserted or fitted into the inside of the forward end annulus portion of the cup-shaped member, it is also possible to provide a separate spacer in order to provide the gap between the filter means accommodated within the housing and the circumferential wall of the cylindrical member. In this case, also, as in the case of the forward end annulus portion of the cup-shaped member used as a spacer, in order to ensure a constant gap, it is preferable that the inner surface of the circumferential wall surface and the inner surface of the spacer be flush with each other and the swollen circumferential wall surface be parallel with the axis of the cylindrical member.

Although the cylindrical member and the cup-shaped member can be respectively formed by press molding, casting or forging, it is preferable to form them by press molding a plate. Especially, in a case where the cylindrical member is formed by press molding, it becomes easy to form the crank-shaped portion on the circumferential wall thereof. Press molding of the cylindrical member and the cup-shaped member can be performed by using, respectively, metal plates each having a thickness of 1.2 to 3.0 mm. As this metal plate, any one of a stainless steel plate, nickel plated steel plate, and aluminum alloy plate can be used, or in place of the stainless steel plate, a steel plate having nickel plated thereon, etc. can be used. The cylindrical member and cup-shaped member formed by, for example, press molding can be integrated with each other by bonding to each other. This bonding can be performed by, for example, electron beam welding, laser welding, TIG welding or projection welding.

The filter means accommodated and disposed within the housing is substantially shaped like a cylinder and the outer periphery thereof opposes the inner surface of the circumferential wall of the housing, whereby the gap is formed therebetween. The filter means functions to eliminate the combustion residues produced by the burned gas generating means and also to cool the combustion gas. As such filter means, a filter conventionally used and intended to purify the generated gas and/or a coolant for cooling the generated gas can be used. Also, for example, a multi-layer wire mesh filter obtained by forming a wire mesh composed of a suitable material into an annular multi-layer, followed by compression molding can be used. More specifically, this laminate wire mesh filter can be molded by forming a plain stitched stainless steel made wire mesh into a cylindrical member and repeatedly bending one end portion thereof to form an annular multi-layer body, followed by compression molding within a mold, or by forming a plain stitched stainless steel made wire mesh into a cylindrical member and radially pressing it to form a plate member, which is then wound multiplex into a cylindrical configuration to form a multi-layer body, followed by compression molding within a mold. As the material of the wire mesh, a stainless steel such as SUS 304, SUS 310S, SUS 316 (JIS notation), etc. can be used. The stainless steel SUS 304 (18Cr-8Ni-0.06C) exhibits an excellent corrosion resistance as an austenite system stainless steel. Since regarding this laminate wire mesh filter, the one whose axial length is relatively short can be more easily formed, in the case of the gas generator whose axial length is longer, it is possible to contiguously connect a plurality of laminate wire mesh filters in the axial direction thereof.

Regarding the system of sensing the impact and operating the igniting means, as long as the gas generator has the above-mentioned construction, the gas generator for air bag of the present invention may be any one of the mechanical ignition type gas generator wherein the igniting means is operated by the impact sensor sensing an impact solely by the use of a mechanical constitution to cause the generation of a gas, and the electrical ignition type gas generator wherein the igniting means is operated by an electric signal transmitted from an impact sensor having sensed an impact to cause the generation of a gas.

In the mechanical ignition type gas generator using the mechanical ignition type igniting means, a mechanical sensor sensing an impact solely by the use of a mechanical constitution, such as that wherein a plunger is shot by the movement of a weight is accommodated within the housing. This housing is formed with a plurality of gas discharge ports and it is arranged such that an igniting means composed of a detonator pierced through by means of a plunger which is shot from the mechanical sensor, thereby being ignited and burned, a transfer charge ignited and burned by the flame of the detonator, gas generating means ignited and burned by the flame of the transfer charge to generate a gas, and filter means for cooling and purifying the generated gas are accommodated within the housing. On the other hand, the electrical ignition type gas generator, using the electrical ignition type igniting means includes igniting means composed of an igniter operated by an electric signal transmitted from the sensor having sensed an impact, a transfer charge ignited and burned by the operation of the igniter, gas generating means ignited and burned by the flame of the transfer charge to thereby generate a gas, and filter means for cooling and purifying the generated gas are accommodated within the housing having gas discharge ports. In the mechanical ignition type or electrical ignition type gas generator, additionally, it is of course possible to suitably selectively adopt the construction that is advantageous from the viewpoint of the operational performance.

Although as the gas generating means used in the present gas generator, an inorganic azide which has been conventionally widely used, especially the one which is based on sodium azide (sodium azide) such as an equivalent mixture of, for example, sodium azide and copper oxide can be used. From the viewpoint of safety and the like, it is more advantageous to use a non-azide based gas generating agent. Various types of compositions have hitherto been proposed as the non-azide based gas generating agent compositions and includes as known compositions, for example, a composition having as main components a nitrogen-containing organic compound such as tetrazoles, triazoles or metallic salts thereof and an oxygen-containing oxidizing agent such as alkali metal nitrates and a composition having as fuel and nitrogen source triaminoguanidine nitrate, carbohydrazide, nitroguanidine, etc. and uses as the oxidizing agent nitrates, chlorates or perchlorates of alkali metals or alkaline earth metals. Any of these compositions can be used in the present invention as the gas generating agent but the present invention is not limited thereto. Such compositions are suitably selected according to the requirements of the combustion velocity, non-toxic characteristic and combustion temperature. The gas generating agent is used in suitable shape such as a pellet, wafer, hollow circular column or disk.

The above-mentioned gas generator for air bag is accommodated into the module casing along with the air bag that is expanded by introducing thereinto the gas generated from the gas generator, to form an air bag system. This air bag system also contains therein an impact sensor for sensing an impact to operate the gas generator. In a case where the gas generator is a mechanical ignition type gas generator, this impact sensor corresponds to a mechanical sensor, which is accommodated into the housing along with the igniting means. On the other hand, in a case where the gas generator is an electrical ignition type gas generator, the impact sensor is, for example, the semiconductor type acceleration sensor disposed outside a console box. This semiconductor type acceleration sensor has four semiconductor distortion gauges formed on the beam constituted by a silicon substrate which is so arranged that when an acceleration is applied thereto, the beam may be flexed, with these semiconductor distortion gauges being bridge connected. When an acceleration is applied, the beam is flexed with the result that distortion occurs in the surface. Due to the occurrence of this distortion, the resistance of the semiconductor distortion gauge varies and this variation in resistance is detected as a voltage signal that is proportional to the acceleration. Especially, in a case where using an electrical ignition type gas generator as the gas generator, the air bag system can further contain a control unit disposed outside the module casing. This control unit is equipped with an ignition determining circuit, whereby it is arranged such that a signal from the semiconductor type acceleration sensor is input to this ignition determining circuit. At a point when the impact signal from the sensor exceeding a certain value, the control unit starts to perform its calculation and, when the calculation result exceeds a certain value, an operation signal is output to the gas generator.

In this air bag system, the gas generator is operated in interlocking relation with the sensing of an impact by the impact sensor and discharges a combustion gas from its gas discharge ports. This combustion gas is jetted into the air bag, whereby the air bag breaks the module cover and expanded to form a cushion between a hard structure within the vehicle and a passenger, which serves to absorb the impact.

DETAILED DESCRIPTION OF THE PREFERRED EMBODIMENTS

An embodiment of the present invention will now be explained with reference to the drawings.

Figure 1:
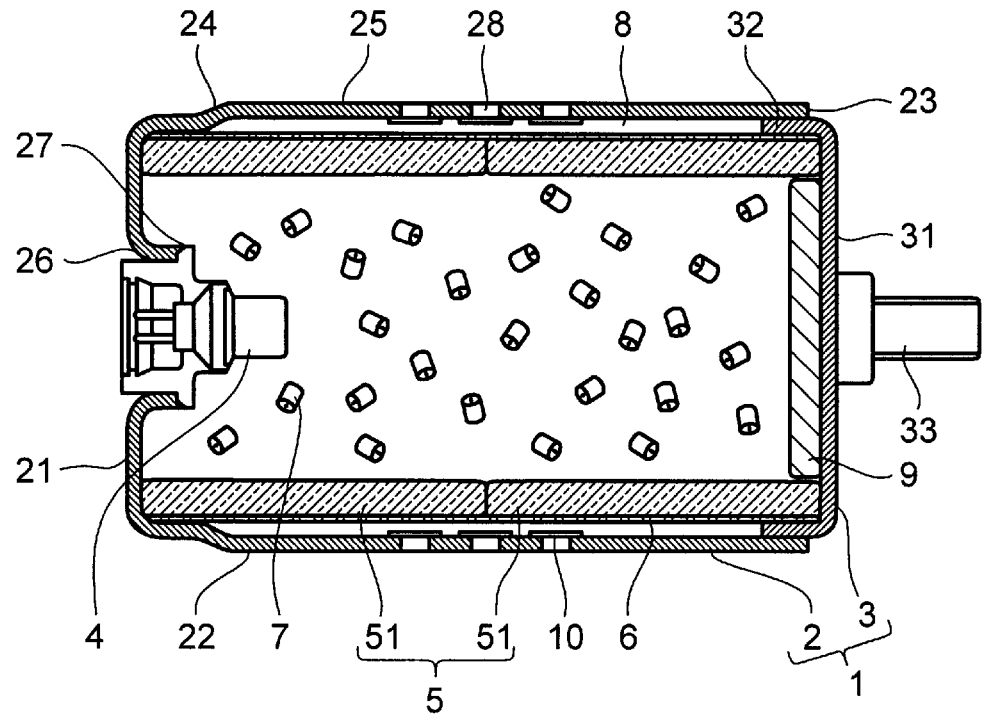
FIG. 1 is a longitudinal sectional view illustrating a gas generator for air bag of the present invention.
Figure 2:
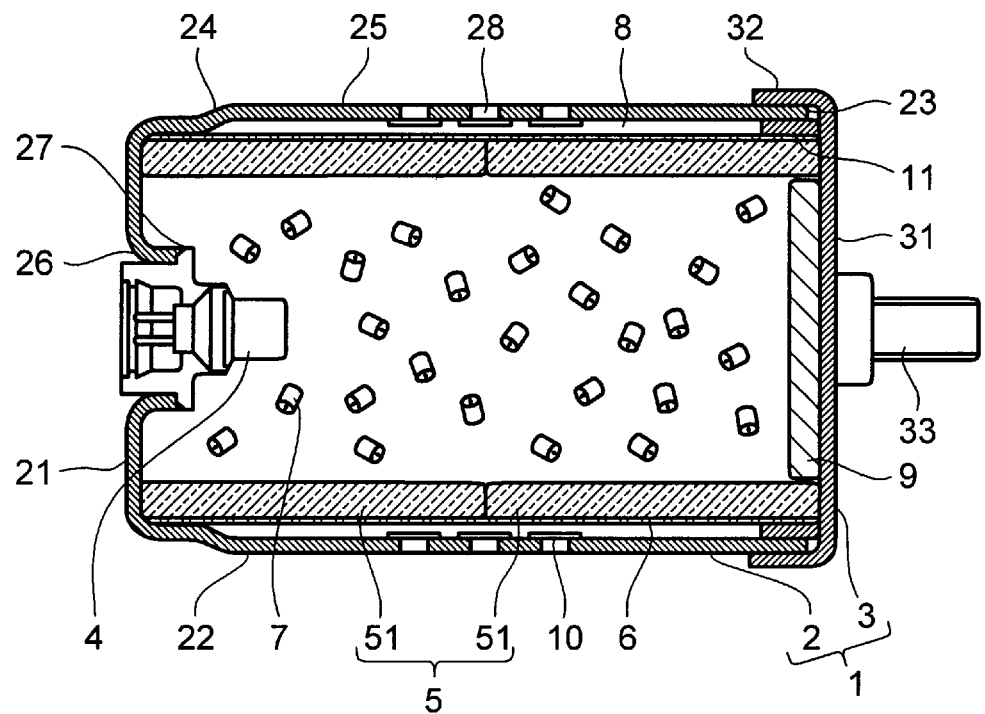
FIG. 2 is a longitudinal sectional view illustrating a gas generator for air bag according to another embodiment of the present invention.
Figure 3:
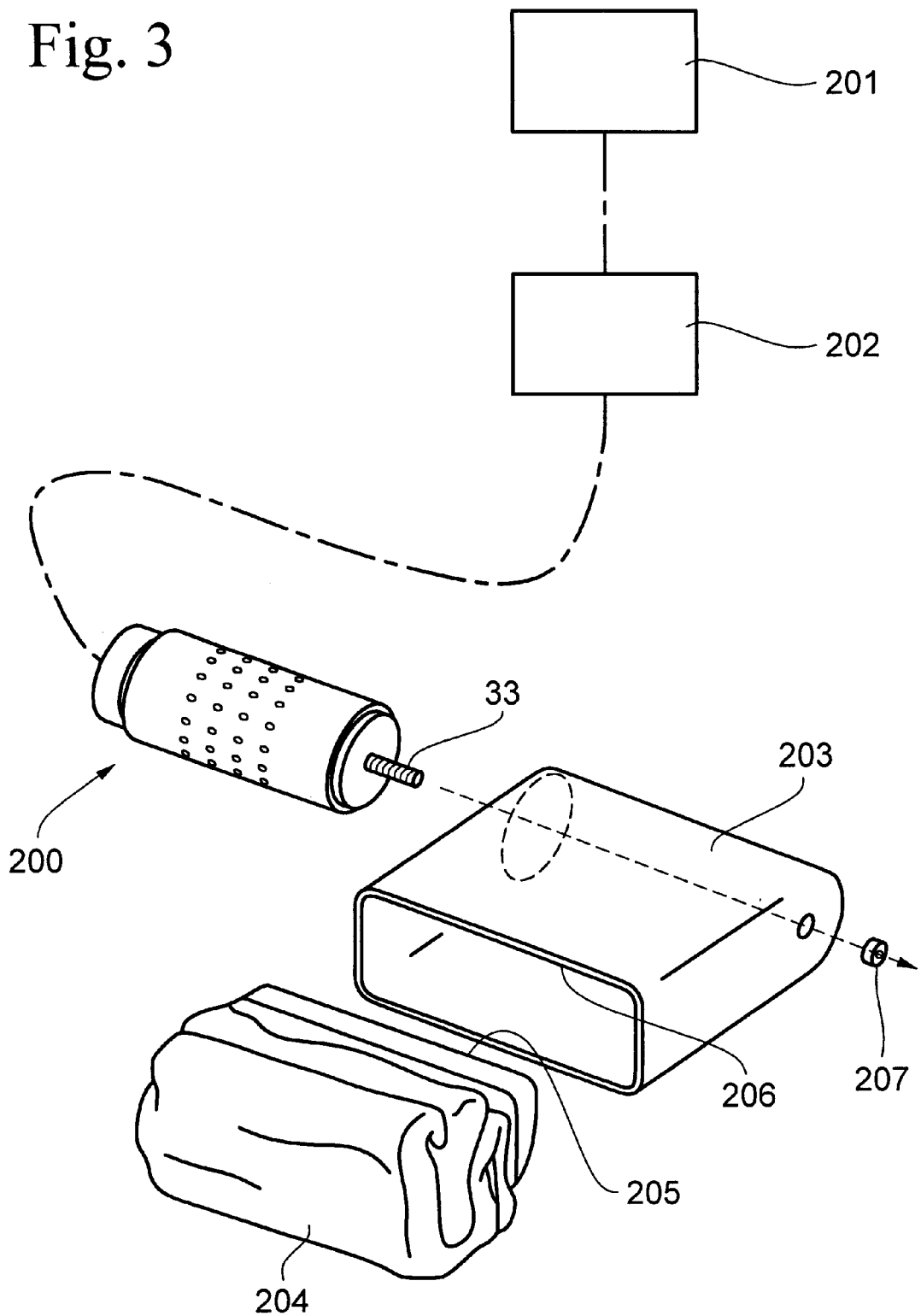
FIG. 3 is a constructional view illustrating an air bag system of the present invention.

FIG. 1 is a longitudinal sectional view illustrating a gas generator for air bag according to the present invention. FIG. 2 is a longitudinal sectional view illustrating a gas generator for air bag according to another embodiment of the present invention. FIG. 3 is a constructional view illustrating an air bag system according to the present invention.

The gas generator for air bag illustrated in the embodiment of FIG. 1 is one which is formed into a substantially cylindrical configuration which is elongate in the axial direction thereof. Especially, this gas generator is suitable for use in an air bag system disposed on a passenger's seat side. A housing 1 of this gas generator is formed by press molding a stainless steel plate to form a cylindrical member 2 that is substantially cylindrical and a cup-shaped member 3 that is substantially shaped like a cup and inserting and fitting a forward end annulus portion 32 of the cup-shaped member 3 into the other end opening 23 of the cylindrical member 2 and then welding and integrating the both to each other by laser welding. The cylindrical member 2 constituting this housing 1 is substantially shaped like a cylinder and, in a side surface 21 of one end thereof, a central opening 26 accommodating igniting means is formed. Also, this central opening 26 has an igniting means engagement portion 27 by being bent in the axial direction of the housing 1. Also, the cylindrical member 2 is provided in and on a circumferential wall 22 thereof with a plurality of gas discharge ports 28 that are disposed circumferentially and axially, and a crank-shaped portion 24 forming a swollen circumferential wall portion 25 obtained by radially swelling the circumferential wall 22. The cup-shaped member 3 that is inserted and fitted into the other end opening 23 of the cylindrical member 2 is composed of an end flat surface portion 31 disposed opposing one end side surface of the cylindrical member 2 and a forward end annulus portion 32 integrally formed on a circumferential edge of the end flat surface portion 31 and inserted into the other end opening 23 of the cylindrical member 2. Further, at the center of the end flat surface portion 31 of the cup-shaped member 3, an attaching member 33, for attaching the gas generator, extending in the axial direction of the cup-shaped member 3 is also formed.

And, within the housing 1 formed in this way, filter means disposed such that an outer periphery thereof opposes the inner circumferential surface of the housing 1, i.e., a coolant/filter 5, a punching plate 6 surrounding the outer periphery of the coolant/filter 5 and preventing the deformation thereof, an igniter 4 functioning as the igniting means operating in interlocking relation with the sensing of an impact, gas generating means, i.e., gas generating agent 7, that generates a combustion gas to be ignited by the igniting means, and a cushion member 9 supporting the gas generating means are accommodated. In order to prevent the entry of humidity from the outside into the housing, an aluminum tape 10 is adhered with respect to the gas discharge ports of the cylindrical member 2, to close the gas discharge ports 28.

In the embodiment as illustrated in FIG. 1, since the crank-shaped member 24 formed on the circumferential wall 22 of the cylindrical member 2 is constructed such that the swollen circumferential wall portion 25 is swollen in the radial direction of the cylindrical member 2 by the extent that corresponds to the thickness of the forward end annulus portion 32 of the cup-shaped member 3, the coolant/filter 5 is supported by the inner surface of the circumferential wall 22 of the cylindrical member 2 excluding the swollen circumferential wall portion 25 and the inner surface of the forward end annulus portion 32 of the cup-shaped member 3, whereby a gap 8 is formed between the inner surface of the circumferential wall of the housing and the filter means.

Since this gap 8 functions as a gas passage, the generated gas can pass through the entire region of the coolant/filter 5, whereby it is effectively cooled and purified.

As the coolant/filter 5 according to the embodiment illustrated in FIG. 1, multi-layer wire mesh filters 51 obtained by radially laminating stainless steel-made plain stitched wire mesh being laminated radially and compressing radially and axially are used. In these multi-layer wire mesh filters 51, in each layer, loop-shaped meshes are in a forcibly crashed state and these loop-shaped meshes are layered radially. Accordingly, the air-gap structure of the coolant/filter becomes complex, with the result that the coolant/filter has an excellent catching effect. However, since the multi-layer wire mesh filter having uniform air gaps, that is longer in the axial direction, is difficult to form, especially in this embodiment, two multi-layer wire mesh filters 51 that are relatively short in the axial direction are connected to each other in such a way as to be contiguous to each other in the axial direction. Since the outer periphery of the coolant/filter 5 composed of these contiguous multi-layer wire mesh filters 51 is surrounded and reinforced by the punching plate 6 provided with holes at prescribed intervals circumferentially and axially, the mating contiguously connected multi-layer wire mesh filters 51 can have their state of abutment reliably maintained without being separated from each other.

Assembling of the gas generator is performed by, after accommodating the igniter 4, the punching plate 6, the coolant/filter 5, and the gas generating agent 7 into the cylindrical member 2, closing the other end opening of the cylindrical member by the cup-shaped member 3.

In the gas generator constructed as mentioned above, when the impact is sensed by a sensor (not illustrated), the sensor signal is sent to the igniter 4, whereby this igniter 4 is operated. As a result, the gas generating agent 7 is ignited and burned to generate a combustion gas. Since the gap 8 formed outside the coolant/filter 5 functions as the gas passage, this combustion gas passes through the entire region of the coolant/filter 5 and, during this passing, the gas is effectively cooled and also has its combustion residues caught. Then, the combustion gas breaks the aluminum tape 10 adhered onto each of the gas discharge ports 28 and is then jetted from the gas discharge ports 28. The gas jetted in this way flows into an air bag (not illustrated) to cause the expansion of the air bag and form a cushion between a passenger and a rigid structure.

The gas generator for air bag as illustrated in FIG. 2 differs from the gas generator for air bag illustrated in FIG. 1 in the means of the cup-shaped member 3 to be fitted to the cylindrical member 2 and the way the gap 8 is formed between the inner surface of the circumferential wall 22 of the cylindrical member 2 and the outer periphery of the coolant/filter 5. While in the gas generator for air bag illustrated in this embodiment as the cylindrical member 2, the same cylindrical member as previously stated with reference to FIG. 1 is used, the other end opening 23 is fitted into inside the forward end annulus portion 32 of the cup-shaped member 3. Accordingly, the forward end annulus portion 32 of the cup-shaped member 3 according to this embodiment cannot function as a spacer that is otherwise acted upon when forming the gap 8 by separating the inner surface of the circumferential wall 22 of the cylindrical member 2 and the outer periphery of the coolant/filter 5. For this reason, in this embodiment, in order to form the gap between the inner surface of the circumferential wall 22 of the cylindrical member 2 and the outer periphery of the coolant/filter 5, a spacer 11 is separately disposed therebetween. This spacer 11 preferably has a thickness corresponding to the extent to which the swollen circumferential wall portion 5 protrudes in the radial direction of the cylindrical member 2. In this embodiment, in addition, the spacer 11 can be formed integrally with the other end flat surface portion 31 of the cup-shaped member 3, whereby the edge of the other end opening 23 of the cylindrical member 2 is inserted and fitted between the spacer 11 and the forward end annulus portion 32, after which the both are welded together.

FIG. 3 shows an example of the air bag system having the gas generator according to the present invention. This air bag system comprises a gas generator 200, an impact sensor 201, a control unit 202, a module casing 203, and an air bag 204.

As the gas generator 200, one substantially the same as the gas generator explained with reference to FIG. 1 is used, and, with a nut 207 being screwed onto the attaching member 33, the gas generator 200 is fixed inside the module casing 203.

The impact sensor 201 can be comprised of, for example, a semiconductor type acceleration sensor. This semiconductor type acceleration sensor is formed, on a silicon substrate beam arranged to be flexed when an acceleration is applied thereto, with four semiconductor distortion gauges, the four semiconductor distortion gauges being bridge connected. When an acceleration is applied, the beam is flexed with the result that a distortion occurs on the surface. Due to this distortion occurred, the resistance of the semiconductor distortion gauge varies and this variation in resistance is detected as a voltage signal that is proportional to the acceleration.

The control unit 202 is equipped with an ignition determining circuit, to which a signal from the impact sensor 201, such as the semiconductor type acceleration sensor, is input. At a point when the impact signal from the sensor 201 exceeds a certain value, the control unit 202 starts to perform its calculation. When the calculation result exceeds a certain value, the control unit 202 outputs an operation signal to the igniter of the gas generator 200 to operate the gas generator 200.

The module casing 203 is formed of, for example, polyurethane and, within this module casing, the air bag 204 and the gas generator 200 are accommodated to construct a pad module. This pad module is installed within a dash board (not illustrated) or the like of an automotive vehicle.

The air bag 204 is formed of, for example, a nylon (e.g. nylon 66) or polyester and a bag opening 205 thereof is attached to an opening 206 of the module casing 203, whereby the air bag 204 is fixed within the module casing in a folded state.

When, at a time of collision of the automotive vehicle, the semiconductor type acceleration sensor 201 senses the impact, the impact signal is sent to the control unit 202. At a point when the impact signal from the sensor 201 exceeds a certain value, the control unit 202 starts to perform its calculation. Then, when the calculation result exceeds a certain value, the control unit 202 outputs an operation signal to the igniter of the gas generator 200. As a result of this, the igniter is operated to ignite and burn the gas generating agent to thereby generate a gas. This gas is jetted into the interior of the air bag 204, whereby the air bag is inflated to the outside of the module casing 203 to form a cushion for absorbing the impact between a passenger and a vehicle structure such as a dash board.

According to the gas generator of the present invention, by making this gas generator to be a gas generator for air bag which is longer in the axial direction, the gas generator becomes optimum so that it is disposed on the passenger's seat side and, by forming its housing by combining the cylindrical member and the cup-shaped member, the gas generator for air bag becomes easy to manufacture.

Also, since in a case where the forward end annulus portion of the cup-shaped portion is inserted or fitted into the other end opening of the cylindrical member, this forward end annulus portion functions as a spacer for the formation of the gap between the inner surface of the swollen circumferential wall portion and the filter means, the resulting gas generator for air bag becomes advantageous not only from the viewpoint of manufacture but also from the viewpoint of the operational performance such as cooling, purification, etc. of the generated gas by the filter means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas generator for an air bag, comprising:
   a housing having a cylindrical portion, longer in an axial direction thereof, the cylindrical portion having, on a circumferential surface thereof, a swollen circumferential wall portion formed by a circumferential surface of the cylindrical portion, said swollen circumferential wall portion being slightly swollen outwardly in a radial direction;
   ignition means operated by an impact sensor when sensing an impact;
   gas generating means ignited by the ignition means and burned to generate a combustion gas;
   cylindrical coolant means accommodated within said housing for at least cooling the combustion gas; and
   a gap formed between an outer surface of said coolant means and an inner surface of said swollen circumferential wall portion.

2. The gas generator of an air bag as set forth in claim 1, wherein said swollen circumferential wall portion of the housing has a plurality of gas discharge ports disposed in the circumferential direction thereof and in the axial direction thereof.

3. The gas generator for an air bag as set forth in claim 1, wherein said cylindrical coolant means also has a function as a filter for catching combustion residues.

4. A gas generator for an air bag, comprising:
   a housing having a cylindrical portion, and longer in an axial direction thereof, the cylindrical portion having, on a circumferential surface thereof, a swollen circumferential wall portion formed by a circumferential surface of the cylindrical portion, said swollen circumferential wall portion being slightly swollen outwardly in a radial direction;
   a cylindrical coolant provided in said housing and adapted to at least cool a combustion gas; and
   a gap formed between an outer surface of said coolant and an inner surface of said swollen circumferential wall portion.

5. A gas generator for an air bag, comprising:
   a housing having,
      a cylindrical member having a circumferential wall and an end side wall formed by a single piece of material, the circumferential wall being longer in an axial direction and provided with a plurality of gas discharge ports therein, the end side wall that closes a first end of said circumferential wall, having a central opening, and a cup-shaped member, having a flat surface portion and an annulus portion integrally formed at a circumferential edge of said flat surface, said cup-shaped member closing a second end of said circumferential wall by engaging with the second end of said circumferential wall;

ignition means supported by said central opening and operated by an impact sensor when sensing an impact;

gas generating means ignited by said ignition means and burned to generate a combustion gas; and cylindrical coolant means for at least cooling the combustion gas, and having an outer diameter being equal to or smaller than an inner diameter of the annulus portion;

wherein said cylindrical member and said cup-shaped member are combined in a state that said annulus portion of said cup-shaped member is inserted or fitted inside the second end of said cylindrical member, and a gap is defined by an outer circumferential surface of said cylindrical coolant means, an inner surface of said circumferential wall, and said annulus portion of said cup-shaped member inserted between the outer circumferential surface of said coolant means and the inner surface of said circumferential wall as a spacer.

6. The gas generator for air bag as set forth in claim 5, wherein the cylindrical member has, on a circumferential wall surface thereof, a swollen circumerential wall portion formed by the circumferential wall surface of said cylindrical member, said swollen circumferential wall portion being slightly swollen outwardly in a radial direction.

7. A gas generator for air bag as set forth in claim 5, wherein the housing is formed by fitting and welding the cylindrical member and the cup-shaped member to each other.

8. A gas generator for air bag as set forth in claim 5, wherein the gas discharge ports are disposed in the axial and circumferential directions of the circumferential wall of the housing.

9. The gas generator for an air bag as set forth in claim 5, wherein an attaching member for attaching the gas generator extending in the axial direction of the cup-shaped member is fixed at the center of the flat surface portion of said cup-shaped member.

10. A gas generator for air bag as set forth in claim 5, wherein each of the cylindrical member and the cup-shaped member is formed by press molding a plate.

11. The gas generator for air bag as set forth in claim 5, further comprising:

at least one seal tape attached to said housing for closing said plurality of discharge ports.

12. The gas generator for air bag as set forth in claim 5, wherein said cylindrical coolant means includes at least two coolants disposed coaxially adjacent to each other.

13. The gas generator for air bag as set forth in claim 5, further comprising:

a punched plate which surrounds said cylindrical coolant means.

14. A gas generator for air bag as set forth in claim 5, further comprising:

an attaching member extending outwardly from said cup-shaped member.

15. The gas generator for an air bag as set forth in claim 5, wherein said cylindrical coolant means also has a function as a filter for catching combustion residues.

16. A gas generator for an air bag as set forth in claim 5, wherein the central opening formed in one end side wall of the cylindrical member is a re-entrant central opening to which said ignition means is fixed.

17. A gas generator for an air bag, comprising:

a housing including a one piece cylindrical portion and an end wall portion, said end wall portion for closing a first end of said cylindrical portion, said cylindrical portion having a first diameter and at least one diffuser port, and said end wall portion having a second diameter smaller than said first diameter and an opening for attaching an igniter thereto;

at least one cylindrical coolant/filter disposed inside said housing, said at least one cylindrical coolant/filter having a third diameter such that said at least one cylindrical coolant/filter is supported by said end wall portion and a plenum is provided between an outer periphery of said at least one cylindrical coolant/filter and said cylindrical portion;

gas generating propellants disposed inside an inner periphery of said at least one cylindrical coolant/filter; and a cup-shaped member closing a second end of said cylindrical portion.

18. A gas generator of claim 17, wherein said cup-shaped member also has a fourth diameter such that said cup-shaped member supports said coolant/filter inside said housing.

19. A gas generator of claim 17, further comprising:

a spacer inserted between the outer periphery of said coolant/filter and an inner surface of said cylindrical portion to maintain said plenum.

20. An air bag system, comprising:

a gas generator for an air bag including,
a housing having
a cylindrical member having a circumferential wall and an end side wall formed by a single piece of material, the circumferential wall being longer in an axial direction and provided with a plurality of gas discharge ports therein, the end side wall that closes a first end of said circumferential wall, having a central opening, and
a cup shaped member, having a flat surface portion and an annulus portion integrally formed at a circumferential edge of said flat surface, said cup-shaped member closing a second end of said circumferential wall by engaging with the second end of said circumferential wall,
ignition means supported by said central opening and operated by an impact sensor when sensing an impact,
gas generating means ignited by the ignition means and burned to generate a combustion gas, and
cylindrical coolant means for at least cooling the combustion gas, and having an outer diameter being equal to or smaller than an inner diameter of the end annulus portion;

an impact sensor for sensing an impact to operate the gas generator;

an air bag to be expanded upon introducing thereinto a gas generated in the gas generator; and a module casing for accommodating the air bag therein, wherein said cylindrical member and said cup-shaped member are combined in a state that said annulus portion of said cup-shaped member is inserted or fitted inside the second end of said cylindrical member, and a gap is defined by an outer circumferential surface of said cylindrical coolant means, an inner surface of said circumferential wall, and said annulus portion of said cup-shaped member inserted between the outer circumferential surface of said coolant means and the inner surface of said circumferential wall as a spacer.

* * * * *